United States Patent [19]
Chandler et al.

[11] Patent Number: 6,028,160
[45] Date of Patent: Feb. 22, 2000

[54] BIODEGRADABLE VAPOR CORROSION INHIBITOR PRODUCTS

[75] Inventors: Christophe Chandler, Woodbury; Boris A. Miksic, North Oaks, both of Minn.; Scott J. Bradley, Denmark, Wis.

[73] Assignee: Cortec Corporation, St. Paul, Minn.

[21] Appl. No.: 09/164,887

[22] Filed: Oct. 1, 1998

[51] Int. Cl.⁷ .................................................. C08G 63/00
[52] U.S. Cl. ........................... 528/176; 528/190; 528/193; 528/194; 524/64
[58] Field of Search ..................................... 528/176, 190, 528/193, 194; 524/64

[56] References Cited

U.S. PATENT DOCUMENTS 4,132,735   1/1979   Lamberti .................................. 562/582

*Primary Examiner*—Terressa Mosley-Boykin
*Attorney, Agent, or Firm*—Haugen Law Firm PLLP

[57] ABSTRACT

Biodegradable resin products consisting essentially of a polymeric resin of polyethylene, starch, polyesters such as polylactic acid, or other suitable polyesters. In admixture with the resin is a particulate vapor phase corrosion inhibitor selected from amine salts, ammonium benzoate, triazole derivatives, tall oil imidazolines, alkali metal molybdates, alkali dibasic acid salts, and mixtures thereof, and is present in an amount ranging from between about 1% and 3% by weight of the polymeric resin.

10 Claims, No Drawings

BIODEGRADABLE VAPOR CORROSION INHIBITOR PRODUCTS

BACKGROUND OF THE INVENTION

The present invention relates generally to an improved more environmental friendly resinous product particularly useful in packaging and/or packing applications. The product incorporates the features of biodegradability together with the incorporation of a vapor phase corrosion inhibitor for protection of metallic surfaces positioned in proximity to the material, such as for example, when held or contained within an enclosure prepared from the product as a film or shroud, or contained in a package utilizing cornstarch corrosion inhibiting bulk fillers, normally designated "peanuts". Plastic films and packing materials formed of raw materials which are biodegradable are commercially available, and because of their more environmental friendly properties, they are becoming more and more in demand. For example, plastic resin films have a wide variety of uses, including forming enclosures such as shipping sacks for creating a protective environment for metallic articles. Additionally, resinous products may be prepared from other base materials, with such articles having found specific application as bulk packing dividers or filler objects useful in a variety of packaging applications. While conventional films or objects fabricated from polyolefin resins have found wide application for packaging purposes, the need for resin products which are biodegradable is both recognized and for a variety of applications, is becoming a requirement. Because of their different physical properties, however, these products prepared from biodegradable materials possess some disadvantageous characteristics or properties which may be overcome through utilization of the features of the present invention.

Biodegradable plastic films or objects have certain physical and mechanical properties which differ from those of the conventional and well-known polyolefin films such as polyethylene and polypropylene. For example, the commercially available biodegradable films have significantly higher breathability and moisture attraction and permeability. Because of these physical properties, biodegradable plastic films typically offer less protection to metallic articles than is available from the more traditional polyolefin films. However, this disadvantage may be overcome when the biodegradable plastic resin film is combined with a particulate vapor phase corrosion inhibitor dispersed within and through the film or coated on the surface of the film. The selected vapor phase corrosion inhibitors used in connection with the present invention are highly compatible with biodegradable films, and offer significant protection to metallic articles within an enclosure. In particular, those films comprising a film forming resin selected from the group consisting of a polylactic acid homopolymer, a polycaprolactone polymer or other suitable polyesters such as an adipic acid, succinic acid, butanediol and a small amount of terephthalic acid have been found to have beneficial effects when used in combination with inhibitors in accordance with the present invention. In addition, biodegradable films fabricated from polyethylene with starch or selected oxidizing agents, and other polyester combinations may also be utilized. Films comprising these resins in either their pure or blended form possess the property of biodegradability along with higher permeability and higher breathability when compared to those same properties exhibited by conventional polyolefin films.

In the formation of enclosures or shrouds for metallic articles, certain applications find the higher permeability and breathability to be an advantage. Such applications include enclosures for high humidity environments to avoid "greenhouse" effects. To offset the greater permeability and accessibility of the enclosure to corrosive atmospheres rich in water vapor, salt air, carbon dioxide, sulfur dioxide, hydrogen sulfide, or other gases which pose a threat to the surfaces of metallic objects, a vapor phase corrosion inhibitor in films of the type selected for this invention will provide significant protection for metallic articles, as well as other advantages. Similar advantages exist when employing the formulations of the present invention for replacing molded or foamed polystyrene articles such as packing peanuts, foams, sheets, and the like.

The selected vapor phase and contact corrosion inhibitors which have been found highly effective for use in connection with the present invention are amine salts, ammonium benzoate, alkali molybdates, alkali nitrites, alkali dibasic acid salts, and triazole compounds. These materials have been found to have highly effective corrosion inhibiting properties when combined with or coated on films in accordance with the present invention. The corrosion inhibitors are preferably prepared and available in particulate form with particles being of a preferred size range. For most film applications, the corrosion inhibitors found most useful have a maximum particle size range less than about 50 microns, with a size of between about 20 and 30 microns being preferred.

When a film substrate has served its intended purpose and is to be discarded, it is becoming more and more important that the composition from which the film is formed be biodegradable. Indeed, certain legislation has been proposed which would ban the disposal of bags fabricated from non-biodegradable plastic film from compost heaps or piles. In this connection, standards have been adopted for classifying film bags as biodegradable, with this standard normally providing that no more than 10% of the film's original weight can remain on a ⅜th-inch screen following 12 weeks of exposure to a compost medium. Resin films prepared from a polymer resin selected from the group consisting of polylactic acid homopolymer, polyesters of butanediol, adipic acid, succinic acid, and terephthalic acid or polycaprolactone meet these standards. Other film forming materials including polyethylene with starch and certain polyesters are expected to meet these standards as well. The biodegradable properties and characteristics of these films are not adversely affected when blended with one or more of the particulate corrosion inhibitors as set forth hereinabove.

Turning now to the biodegradable film substrates, a lactic acid homopolymer is commercially available from Cargill, Inc. of Minnetonka, Minn. under the trade designation "Ecopla 4200-D", with this homopolymer being useful in the production of biodegradable films. Additionally, materials available from Mitsui Chemicals Inc. of Japan under the trade designation "Lacea" may be used. A biodegradable film forming resin is available from BASF of Parsippany, NJ under the trade designation "Ecoflex" is useful for forming film products. Polyester polymers prepared from polycaprolactone are commercially available from Union Carbide under the trade designation "TONE", and "EASTAR" which is commercially available from Eastman Chemical. "Bionolle", a polyester available commercially from Showa Denko of Japan, is particularly useful as a film, a foam, or a non-woven sheet that can be coated or extruded in contact with corrosion inhibiting chemicals. Each of these resins may be compounded with the selected vapor and contact corrosion inhibitor chemicals or formulations to produce films capable of enhanced corrosion protection to the surfaces of packaged metallic articles. At the same time, when these films have served their useful purpose, they may be discarded as biodegradable materials to be received in conventional composting fields.

It is recognized that biodegradable films are more environmentally friendly, since the degradation of the film renders it more acceptable for use in situations where composting occurs. In accordance with the present invention, biodegradable films may be utilized in applications when the films are combined with the corrosion inhibitors of the type selected for use in connection with the present invention.

SUMMARY OF THE INVENTION

In accordance with the present invention, the corrosion inhibitors preferred for use in combination with films or cushion packaging resins are selected from the group consisting of amine salts, ammonium benzoate, alkali metal molybdates, alkali nitrites, alkali dibasic acid salts, triazole compounds, and mixtures thereof. These corrosion inhibiting materials are especially useful in serving to protect surfaces of most metallic articles, with the triazole component being particularly useful in protecting copper against corrosion. In a typical production application, the selected corrosion inhibitors may be blended with the selected resin in relatively high percentages, such as between 10% and 20% to produce a masterbatch. This concentrated masterbatch formulation may then be further blended with film forming resins to produce a final blend suitable for ultimate extrusion as a film product, preferably containing between 1% and 3% of the vapor and contact corrosion inhibiting component within the film. In order to facilitate production of certain formulations, it is advantageous to prepare masterbatch formulations of a film forming material together with a second component to enhance the oxidation of the resin matrix, thus making it possible to blend various masterbatch formulations together to form the desired finished product.

Therefore, it is a primary object of the present invention to prepare an improved plastic resinous film for use in packaging and other applications, with the improved film combining the features of biodegradability with a vapor phase corrosion inhibitor for protection of metallic surfaces held or contained within the film.

It is a further object of the present invention to prepare improved plastic resin films for a variety of applications, the film combining the features of biodegradability and corrosion protection, and wherein the films possess higher breathability and moisture permeability when compared with films created from traditional polyolefin resins.

Other and further objects of the present invention will become apparent to those skilled in the art upon a study of the following specification and appended claims.

DESCRIPTION OF THE PREFERRED EMBODIMENT

In accordance with the preferred embodiment of the present invention, biodegradable film/vapor phase corrosion inhibiting blends are prepared for extrusion to produce films containing the desirable combination of properties set forth above. In order to describe the features of the preferred and other embodiments, the following specific examples are given.

THE VCI COMPONENT

The selected corrosion inhibiting chemicals suitable for preparing the masterbatch used in the above examples may alternatively be selected from alkali molybdates, amine salts, ammonium benzoate, triazole compounds and derivatives, alkali nitrites, alkali dibasic acid salts, and mixtures thereof. Preferred mixtures having the following formulations may be advantageously employed:

| Component | Parts by Weight Range |
|---|---|
| FORMULATION 1 | |
| Sodium molybdate | 65–70 parts |
| Benzotriazole | 20–25 parts |
| Dicyclohexylammonium nitrate | 5–10 parts. |
| FORMULATION 2 | |
| Benzotriazole | 25–30% |
| Sodium molybdate | 60–65% |
| Sodium nitrite | 3–5% |
| Dicyclohexylammonium nitrite | 3–5%. |
| FORMULATION 3 | |
| Cyclohexylammonium benzoate | 60–70% |
| Ethanol ammonium benzoate | 5–10% |
| Benzotriazole | 5–10% |
| Triethanolammonium nitrate | 15–25%. |
| FORMULATION 4 | |
| Benzotriazole | 5–10% |
| Sodium sebacate | 55–65% |
| Ammonium benzoate | 15–25% |
| Silica | 0–5% |
| Dicyclohexylammonium nitrite | 5–10% |
| Sodium molybdate | 5–10%. |

EXAMPLE I

A resin blend of polyethylene resin with an additive consisting essentially of cornstarch is prepared. This blend is available under the trade designation "Degra-Novan IR-1025", available from Novon International of Tonawanda, N.Y. This cornstarch polyethylene blend is added to polyethylene resin in an amount comprising 25% of the IR-1025. To this blend is added 2.5% of a vapor phase corrosion inhibitor consisting of selected corrosion inhibitor chemicals described above, with dicyclohexylamine nitrite being selected. The vapor phase corrosion inhibitor material has a particle size of less than 50 microns. This prepared blend is thereafter coextruded to a final film product having a thickness of 5 mils. The breathability and permeability of this film product is greater than that of films prepared from polyethylene, and at the same time, the release of corrosion inhibiting vapor into the enclosure is expedited and accelerated.

As an alternative preferred embodiment, the preferred range of IR-1025 in the resin blend may range from between 10% and 30% of the total resin. Similarly, the corrosion inhibiting component may be included in an amount between 1% and 3% of the final film.

In order to facilitate production of the blend of this example, a first masterbatch may be prepared employing 70% polyethylene resin, 30% cornstarch. A second masterbatch is prepared employing 87% polyethylene resin, balance of 13% being corrosion inhibitor. The two masterbatch components are then blended together to form the finished product, with the formulation then being such that the corrosion inhibitor comprises 2.5% of the total film, and with the cornstarch comprising 12.5% of the resin blend. In order to produce the ratio of components listed above, an appropriate quantity of pure polyethylene may be required. In certain instances, it may be desirable to incorporate up to 25% by weight of corrosion inhibitor, balance resin, in the form of a masterbatch. Thereafter, the masterbatch is blended with other resins and biodegradable products in order to bring the weight percentage of VCI component down to a range of between 1% to 3% by weight of VCI.

EXAMPLE II

A resin blend of PLA (polylactic acid) available from Cargill Inc. of Minnetonka, Minn. and identified with the trade designation "Ecopla 4200D" is extruded with a selected vapor corrosion inhibitor (VCI) component in a ratio of 100 parts PLA and 15 parts VCI to produce a masterbatch suitable for blending. The vapor phase corrosion inhibitor material is a blend of corrosion inhibiting components having the following formulation:

| Component | Percent by Weight |
| --- | --- |
| Cyclohexylammonium benzoate | 60% |
| Ethanol ammonium benzoate | 10% |
| Benzotriazole | 10% |
| Triethanolammonium nitrate | 20% | and has a particle size of less than 50 microns. The masterbatch is further blended with "Ecopla 4200D" at a ratio of 100 parts "Ecopla 4200D" to 15 parts masterbatch to produce a final composition of about 1.5% corrosion inhibiting chemical in the extruded film.

The resulting blend is advantageously utilized as one member of a coextruded laminate film with the blend of this example being in the inside (in use) layer in a two-layer coextruded film laminate. Alternatively, this layer may serve as an inside or center layer in a three-component coextruded laminate film, with the other layers being a suitable higher melting polyester that is easier to process.

EXAMPLE III

A resin blend of "Ecoflex" (BASF of Parsippany, N.J.) is prepared by extruding 100 parts of "Ecoflex" with 15 parts of VCI component consisting of selected vapor corrosion inhibitor components to produce an extruded masterbatch of 12–13% VCI. This masterbatch is further blended with "Ecoflex" and extruded as a film with both biodegradable and corrosion inhibition properties. In this formulation, the VCI component has a size range of up to 100 microns, although a size ranging up to a maximum of about 50 microns may be most suitably employed.

EXAMPLE IV

A resin blend of a "TONE" polymer, commercially available from Union Carbide under the trade designation "P-787" is extruded with selected vapor corrosion inhibitors to produce an extruded masterbatch of about 12% VCI. This masterbatch is further blended with P-787 (polycaprolactone) to produce a mixture that can be extruded as a film, molded into selected shapes or mixed with blowing agents to produce contoured shapes suitable for packaging. The film, extruded articles and foams are especially useful in packaging and protecting metallic components.

EXAMPLE V

A resin blend of polyethylene resin with a cornstarch additive may be coated with a VCI solution, with the final dry coating weight ranging from between about 1 and 5 pounds per 3,000 square feet. The polyethylene which has been rendered biodegradable through blending with cornstarch may be treated with a corona discharge in order to form a coating-receptive surface. Such a material may thereafter be utilized to prepare packaging materials with the VCI coating present being exposed to and positioned along the interior surface of the final package or enclosure. A corrosion inhibiting formulation useful in this application is:

| Component | Percent by Weight Range |
| --- | --- |
| Triethanolamine nitrate | 6%–12% |
| Tolytriazole | 9%–12% |
| Cyclohexylammonium benzoate | 15%–21% |
| Ethanolammonium benzoate | 39%–45% |
| Tall oil imidazoline acetate | 6%–9% |
| Tall oil imidazoline nitrate | 3%–9%. |

EXAMPLE VI

Cornstarch Based Loose Fills

| Component | Percent by Weight |
| --- | --- |
| Sodium molybdate | 65% |
| Sodium nitrite | 25% |
| Benzotriazole | 5% |
| Dicyclohexylammonium nitrite | 5%. |

The formulation was mixed with a starch designated "Hylon VII Starch" available commercially from National Starch Co. at a ratio of 98 parts starch and 2 parts inhibitors. The mixture was processed into peanuts or sheets such as dividers suitable for cushioning and corrosion inhibition.

Alternatively, and consistent with the other features of this Example VI, other corrosion inhibiting formulations as set forth in Formulations 1–4 inclusive above may be appropriately selected and utilized.

EXAMPLE VII

A biodegradable film with a higher starch content was prepared from 85% polyethylene, 12.5% starch and 2.5% vapor corrosion inhibitor chemical. The film was extruded from a blended mixture of "Novan IR4025" which is a pellet formed of 60% polyethylene and 40% starch, and masterbatch pellets containing 88% polyethylene and 12% corrosion inhibitor as set forth in Formulation 1 above. The film was tested and proved suitable for providing the corrosion protection desired. The higher ratio of starch also provided faster biodegradability.

EXAMPLE VIII

A resin blend of a polyester prepared from succinic acid, adipic acid and butanediol, commercially available as "3001" from Showa Denko of Japan under the trade designation "Bionolle", is extruded with selected VCI to produce a masterbatch of about 12% VCI. This masterbatch is further blended with more of this polyester and extruded as a film. Films made with this resin have a higher softening point and find utility where more heat resistance is needed.

EXAMPLE IX

A blend of polyethylene resin, corrosion inhibitor chemicals and an oxidizing agent such as DCP-508 which is commercially available from Environmental Products Inc. of Conroe, Tex., was prepared. The final blend consisted of 100 parts polyethylene resin, 3 parts corrosion inhibitors, and 3 parts DCP-508 which is a polyethylene carrier for selected oxidizing chemicals. This mixture was extruded into a film that possessed excellent corrosion characteristics. The oxidizing chemicals present enables rapid biodegradability of the mainly polyethylene structure.

As a further example of utility, the resin blend of either of Examples I through IX hereinabove may be further blended with a blowing agent in order to form shaped articles such as shaped foams containing vapor phase corrosion inhibitors. Such foams find utility in packing applications.

By way of summary, therefore, the present invention provides a basis for the utilization of a highly desirable more ecologically friendly biodegradable products which, when utilized, enhance the effectiveness of the products for use in the protection of metallic surfaces. Films prepared in accordance with the present invention provide a mechanism for protecting metallic surfaces against the potential deleterious effects of pro-oxidants present in the structure of most biodegradable plastic resin films. It will be further appreciated that the specific examples given herein are provided for purposes of illustration and for demonstrating the preferred manner of utilization of the features of the present invention. Therefore, these examples are illustrative of the present invention and are not deemed to be a limitation upon the scope to which the invention is otherwise entitled.

What is claimed is:

1. In biodegradable resin products consisting essentially of a polymeric resin selected from the group consisting of polyethylene resins, starch, polyesters selected from the group consisting of polylactic acid or polycaprolactone, and copolymer blends of reactant mixtures of butanediol, adipic acid, succinic acid, and terephthalic acid, and wherein a particulate vapor phase corrosion inhibitor is dispersed within the resin product, the combination being characterized in that:

(a) said vapor phase corrosion inhibitor is selected from amine salts, ammonium benzoate, triazole derivatives, alkali dibasic acid salts, alkali nitrites, tall oil imidazolines, alkali metal molybdates, and mixtures thereof, and is present in an amount ranging up to 25% by weight of the polymeric resin;

(b) said biodegradable resin products being further blended with a suitable polymeric resin to provide finished products containing between 1% and 3% vapor phase corrosion inhibitor.

2. The biodegradable resin product as defined in claim 1 being particularly characterized in that said resin is polyethylene.

3. The biodegradable resin product as defined in claim 2 being particularly characterized in that said resin product is extruded into a film form containing up to 3% VCI.

4. The biodegradable resin product as defined in claim 2 being particularly characterized in that said resin product is formed into a shaped article containing up to 3% VCI.

5. Biodegradable resinous bulk filler packing forms consisting essentially of a blend of a polymeric resin selected from the group consisting of polyethylene resins, starch, polyesters selected from the group consisting of polylactic acid, and wherein a particulate vapor phase corrosion inhibitor is dispersed within the said filler packing form, the combination being characterized in that:

(a) said vapor phase corrosion inhibitor is selected from amine salts, ammonium benzoate, triazole derivatives, tall oil imidazolines, alkali metal molybdates, alkali dibasic acid salts, and mixtures thereof, and is present in an amount ranging from between about 1% and 3% by weight of the polymeric resin.

6. The biodegradable resinous bulk filler packing forms as defined in claim 5 being particularly characterized in that said biodegradable resin is cornstarch and wherein said vapor phase corrosion inhibitor has the formulation:

| Component | Percent by Weight |
| --- | --- |
| Sodium molybdate | 65% |
| Sodium nitrite | 25% |
| Benzotriazole | 5% |
| Dicyclohexylammonium nitrite | 5% | and wherein said cornstarch comprises 95% to 99% by weight of said resin blend, and wherein said corrosion inhibitor comprises from between 1% to 5% by weight of said blend.

7. The biodegradable resins of claim 6 being blended with blowing agents to produce shaped foams containing vapor phase corrosion inhibitors.

8. The process of preparing a biodegradable resin film consisting essentially of a polymeric resin film selected from the group consisting of polyethylene resins and polyesters of polymers such as polylactic acid, polycaprolactone or other suitable polyesters, which comprises the steps of:

(a) selecting a particulate vapor phase corrosion inhibitor from the group consisting of polyethylene resins and polyesters of suitable polymers;

(b) preparing a blend of said particulate vapor phase corrosion inhibitor and said biodegradable resin film wherein said vapor phase corrosion inhibitor comprises between 1% and 3% by weight of said polymeric resin; and (c) extruding said blend and orienting the extrudate to form a film having a thickness of between about 1 mil and 10 mils.

9. The biodegradable resin product as defined in claim 2 being particularly characterized in that said resin product contains an in situ biodegradable component in an amount ranging up to about 25% by weight of polymeric resin.

10. The biodegradable resin product as defined in claim 2 being particularly characterized in that said resin product contains starch in particulate form in an amount ranging up to 25% by weight of resin.

* * * * *

UNITED STATES PATENT AND TRADEMARK OFFICE
CERTIFICATE OF CORRECTION

PATENT NO.   : 6,028,160
DATED        : February 22, 2000
INVENTOR(S)  : Christophe Chandler, et al.

It is certified that error appears in the above-identified patent and that said Letters Patent is hereby corrected as shown below:

Column 8,
Line 34, claim 8, should read as follows:

8. The process of preparing a biodegradable resin film consisting essentially of a polymeric resin film selected from the group consisting of polyethylene resins, starch, polyesters selected from the group consisting of polylactic acid or polycaprolactone, and copolymer blends of reactant mixtures of butanediol, adipic acid, succine acid, and terephthalic acid which comprises the steps of:

(a) selecting a particulate vapor phase corrosion inhibitor selected from the group consisting of amine salts, ammonium benzoate, triazole derivatives, alkali dibasic acid salts, alkali nitrites, tall oil imidazolines, alkali metal molybdates, and mixtures thereof;

(b) preparing a blend of said particulate vapor phase corrosion inhibitor and said biodegradable resin film wherein said vapor phase corrosion inhibitor comprises between 1% and 3% by weight of said polymeric resin; and c) extruding said blend and orienting the extrudate to form a film having a thickness of between about 1 mil and 5 mils.

Signed and Sealed this

Ninth Day of October, 2001

*Attest:*

NICHOLAS P. GODICI
*Attesting Officer*    *Acting Director of the United States Patent and Trademark Office*